US010673892B2

(12) United States Patent
Provos et al.

(10) Patent No.: US 10,673,892 B2
(45) Date of Patent: *Jun. 2, 2020

(54) DETECTION OF MALWARE FEATURES IN A CONTENT ITEM

(71) Applicant: Google LLC, Mountain View, CA (US)

(72) Inventors: Niels Provos, Mountain View, CA (US); Yunkai Zhou, Los Altos, CA (US); Clayton W. Bavor, Jr., Palo Alto, CA (US); Eric L. Davis, Menlo Park, CA (US); Mark Palatucci, Pittsburgh, PA (US); Kamal P. Nigam, Pittsburgh, PA (US); Christopher K. Monson, Swissvale, PA (US); Panayiotis Mavrommatis, Mountain View, CA (US); Rachel Nakauchi, Yelm, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/392,414

(22) Filed: Dec. 28, 2016

(65) Prior Publication Data

US 2017/0111375 A1  Apr. 20, 2017

Related U.S. Application Data

(63) Continuation of application No. 13/587,025, filed on Aug. 16, 2012, now Pat. No. 9,563,776, which is a (Continued)

(51) Int. Cl.
H04L 29/06 (2006.01)
G06N 20/00 (2019.01)
(Continued)

(52) U.S. Cl.
CPC .......... *H04L 63/145* (2013.01); *G06F 21/564* (2013.01); *G06F 21/577* (2013.01);
(Continued)

(58) Field of Classification Search
None
See application file for complete search history.

(56) References Cited

U.S. PATENT DOCUMENTS 6,285,999 B1  9/2001  Page
6,622,134 B1  9/2003  Sorkin
(Continued)

FOREIGN PATENT DOCUMENTS

EP  1672515  6/2006
WO  WO 2007/076715  7/2007

OTHER PUBLICATIONS

Brin et al., "The Anatomy of a Large-Scale Hypertextual Web Search Engine," Seventh International World Wide Web Conference, Brisbane, Australia, Apr. 14-18, 1998, 20 pages.
(Continued)

*Primary Examiner* — J. H. Hur
(74) *Attorney, Agent, or Firm* — Fish & Richardson P.C.

(57) ABSTRACT

Intrusion features of a landing page associated with sponsored content are identified. A feature score for the landing page based on the identified intrusion features is generated, and if the feature score for the landing page exceeds a feature threshold, the landing page is classified as a candidate landing page. A sponsor account associated with the candidate landing page can be suspended, or sponsored content associated with the candidate landing page can be suspended.

8 Claims, 9 Drawing Sheets

Related U.S. Application Data continuation of application No. 13/230,544, filed on Sep. 12, 2011, now Pat. No. 8,515,896, which is a continuation of application No. 11/868,321, filed on Oct. 5, 2007, now Pat. No. 8,019,700.

(51) Int. Cl.
| | |
|---|---|
| G06F 21/56 | (2013.01) |
| G06F 21/57 | (2013.01) |
| H04L 12/26 | (2006.01) |
| H04L 29/08 | (2006.01) |

(52) U.S. Cl.
CPC ......... *G06N 20/00* (2019.01); *H04L 43/0876* (2013.01); *H04L 67/02* (2013.01); *G06F 2221/2119* (2013.01)

(56) References Cited

U.S. PATENT DOCUMENTS

| | | | |
|---|---|---|---|
| 6,654,725 | B1 | 11/2003 | Langheinrich et al. |
| 7,111,246 | B2 | 9/2006 | Suave et al. |
| 7,222,127 | B1 | 5/2007 | Bem et al. |
| 7,991,710 | B2 | 8/2011 | Palatucci et al. |
| 8,019,700 | B2 | 9/2011 | Provos et al. |
| 8,515,896 | B2 | 8/2013 | Zhou et al. |
| 9,563,776 | B2 * | 2/2017 | Provos ................. G06F 21/564 |
| 2003/0023875 | A1 | 1/2003 | Hursey |
| 2003/0097591 | A1 | 5/2003 | Pham et al. |
| 2003/0188194 | A1 | 10/2003 | Currie et al. |
| 2004/0064736 | A1 * | 4/2004 | Obrecht ................ G06F 21/566 726/24 |
| 2004/0143756 | A1 | 7/2004 | Munson et al. |
| 2004/0236884 | A1 | 11/2004 | Beetz |
| 2005/0108227 | A1 | 5/2005 | Russell-Falla et al. |
| 2005/0203806 | A1 | 9/2005 | Jacobs et al. |
| 2006/0015404 | A1 | 1/2006 | Tran |
| 2006/0015722 | A1 | 1/2006 | Rowan et al. |
| 2006/0075500 | A1 | 4/2006 | Bertman et al. |
| 2006/0080735 | A1 | 4/2006 | Brinson et al. |
| 2006/0085854 | A1 | 4/2006 | Agrawal et al. |
| 2006/0130144 | A1 | 6/2006 | Wernicke |
| 2006/0149623 | A1 | 7/2006 | Badros et al. |
| 2006/0179315 | A1 | 8/2006 | Sasage et al. |
| 2006/0218235 | A1 | 9/2006 | DeCnodder |
| 2006/0253584 | A1 | 11/2006 | Dixon |
| 2006/0259974 | A1 | 11/2006 | Marinescu |
| 2006/0265493 | A1 * | 11/2006 | Brindley ................ G06Q 30/02 709/224 |
| 2007/0005652 | A1 | 1/2007 | Choi et al. |
| 2007/0016922 | A1 | 1/2007 | Koch |
| 2007/0067842 | A1 | 3/2007 | Greene |
| 2007/0118903 | A1 | 5/2007 | Bates et al. |
| 2007/0124582 | A1 | 5/2007 | Shannon |
| 2007/0130349 | A1 | 6/2007 | Wong |
| 2007/0143843 | A1 | 6/2007 | Nason |
| 2007/0192855 | A1 | 8/2007 | Hulten et al. |
| 2009/0070873 | A1 * | 3/2009 | McAfee ................. G06F 21/56 726/23 |
| 2012/0005753 | A1 | 1/2012 | Zhou et al. |

OTHER PUBLICATIONS

Casado, M. and Freedman, M.J., "Peering Through the Shroud: The Effect of Edge Opacity on IP-Based Client Identification," In Proceedings of the 4th Networked Systems Design and Implementation, Apr. 2007.

Christianson, B. and Harbison, W.S., "Why Isn't Trust Transitive?" In Proceedings of the International Workshop on Security Protocols, pp. 171-176, London, UK, 1997. Springer-Verlag.

Christodorescu, M., et al., "Malware Normalization," Technical Report 1539, University of Wisconsin, Madison, Wisconsin, USA, Nov. 2005.

Cooke, E., et al., "The Zombie Roundup: Understanding, Detecting, and Disrupting Botnets," In Proceedings of the USENIX SRUTI Workshop, pp. 39-44, 2005.

Dean, J. and Ghemawat, S., "MapReduce: Simplified Data Processing on Large Clusters," In Proceedings of the Sixth Symposium on Operating System Design and Implementation, pp. 137-150, Dec. 2004.

Hammami, 2003, IEEE, 0-7695-1932, "WebGuard: Web based adult content detection and filtering system," Proceedings of the IEEE/WIC international conference on webg intelligence (WI'03), 5 pages.

Microsoft Security Bulletin MS060-014, Vulnerability in the Microsoft Data Access Components (MDAC) Function Could Allow Code Execution (911562), <http://www.microsoft.com/technet/security/Bulletin/>, MS06-014.mspx, May 2006.

Moshchuk, A., et al., "A Crawler-based Study of Spyware on the Web," In Proceedings of the 2006 Network and Distributed System Security Symposium, pp. 17-33, Feb. 2006.

Provos et al., 'Hide and Seek:An introduction to Steganography', 2003, IEEE, 1540-7993, pp. 32-44.

Provos, N., et al., "The Ghost in the Browser Analysis of Web-based Malware," [on-line], [Retrieved on Sep. 10, 2007], Retrieved from the internet <http://www.usenix.org/events/hotbots07/tech/full_papers/provos/provos.pdf>.

Wang Y-M., "Automated Web Patrol with Strider HoneyMonkeys: *Finding Web Sites That Exploit Browser Vulnerabilities*" In Proceedings of the 2006 Network and Distributed System Security Symposium, pp. 35-49, Feb. 2006.

EPO Communication pursuant to Article 94(3) EPC, EPO Application No. 08 835 079.8-2212, dated Oct. 31, 2011, 4 pages.

Supplementary European Search Report for EP08835079 dated Oct. 17, 2011. 3 pages.

Notification of Transmittal of the International Search Report and the Written Opinion of the International Search Authority, or the Declaration issued in PCT/US2008/078807 dated Mar. 31, 2009.

Chinese Office Action issued in Chinese Application No. 200880119072.0 dated Dec. 16, 2011, 10 pages, includes English Translation.

Chinese Office Action issued in Chinese Application No. 200880119072.0 dated Sep. 13, 2012, 8 pages, includes English Translation.

U.S. Office Action issued in U.S. Appl. No. 11/868,321, dated Aug. 19, 2010, 22 pages.

U.S. Notice of Allowance in U.S. Appl. No. 11/868,321, dated Dec. 9, 2010, 7 pages.

U.S. Notice of Allowance in U.S. Appl. No. 11/868,321, dated May 6, 2011, 8 pages.

U.S. Office Action in U.S. Appl. No. 12/041,309, dated Aug. 6, 2010, 18 pages.

U.S. Office Action in U.S. Appl. No. 12/041,309, dated Jan. 4, 2011, 11 pages.

U.S. Notice of Allowance in U.S. Appl. No. 12/041,309, dated Mar. 30, 2011, 8 pages.

U.S. Notice of Allowance in U.S. Appl. No. 13/230,544, dated Feb. 17, 2012, 10 pages.

U.S. Supplemental Notice of Allowance in U.S. Appl. No. 13/230,544, dated Jan. 16, 2013, 8 pages.

U.S. Notice of Allowance in U.S. Appl. No. 13/230,544, dated Jun. 5, 2013, 9 pages.

EPO Communication pursuant to Article 94(3) EPC, EPO Application No. 08 835 079.8, dated Feb. 10, 2014, 5 pages.

European Search Report issued in European Application No. 16206712.8, dated Mar. 31, 2017, 6 pages.

Partial European Search Report issued in European Application No. 17194191.7, dated Dec. 8, 2017, 13 pages.

EP Extended European Search Report issued in European Application No. 17194191.7, dated Jul. 16, 2018, 12 pages.

\* cited by examiner

DETECTION OF MALWARE FEATURES IN A CONTENT ITEM

CROSS-REFERENCE TO RELATED APPLICATION

This application is a continuation of U.S. patent application Ser. No. 13/587,025 filed Aug. 16, 2012, which is a continuation of U.S. patent application Ser. No. 13/230,544 filed Sep. 12, 2011, which is a continuation of U.S. patent application Ser. No. 11/868,321 filed Oct. 5, 2007, the entire contents of which are hereby incorporated by reference.

TECHNICAL FIELD

The document relates to management of intrusive software.

BACKGROUND

Interactive media (e.g., the Internet) has great potential for improving the targeting of sponsored content, e.g., advertisements ("ads"), to receptive audiences. For example, some websites provide information search functionality that is based on keywords entered by the user seeking information. This user query can be an indicator of the type of information of interest to the user. By comparing the user query to a list of keywords specified by an advertiser, it is possible to provide targeted ads to the user.

Another form of online advertising is ad syndication, which allows advertisers to extend their marketing reach by distributing ads to additional partners. For example, third party online publishers can place an advertiser's text or image ads on web properties with desirable content to drive online customers to the advertiser's website.

The ads, such as creatives that include several lines of text, images, or video clips, include links to landing pages. These landing pages are pages on advertiser websites or on syndicated publisher websites that users are directed to when the users click on the ads. Some of these landing pages, however, may include intrusive software, e.g., software, scripts, or any other entities that are deceptively, surreptitiously and/or automatically installed. Such software entities that are intrusively installed can be generally characterized as "malware," a portmanteau of the words "malicious" and "software." The software, however, need not take malicious action to be malware; any software that is intrusively installed can be considered malware, regardless of whether the actions taken by the software are malicious. Thus, in addition to Trojan Horses, viruses, and browser exploits, other software such as monitoring software can be considered malware. The malware can be present in the landing page intentionally or unintentionally. For example, an advertiser's site can be hacked and malware inserted directly onto the landing page; a malicious advertiser can insert malware into a landing page; a click-tracker can insert malware through a chain of redirects that lead to the final uniform resource locator (URL) of the landing page; an advertiser may place ads or gadgets on a page populated by third parties that insert malware onto the landing page; etc.

Once a landing page is known to have malware, an advertisement publisher can preclude the serving of the landing page. However, an advertisement publisher, e.g., Google, Inc., may have access to hundreds of millions of advertisements and corresponding landing pages associated with the advertisements. As could be understood, it may be difficult to check/re-check each landing page in depth for the presence of malware.

SUMMARY

Disclosed herein are apparatus, methods and systems for the detection and processing of malware in sponsored content. In an implementation, intrusion features of a landing page associated with sponsored content are identified. A feature score for the landing page based on the identified intrusion features is generated, and if the feature score for the landing page exceeds a feature threshold, the landing page is classified as a candidate landing page. The candidate landing page can be provided to a malware detector to determine whether malware is present in the landing page. In some implementations, a sponsor account associated with the candidate landing page can be suspended. In some implementations, an advertisement associated with the candidate landing page can be suspended.

In another implementation, a method includes partitioning landing pages associated with advertisements into training landing pages and testing landing pages. A classification model is iteratively trained on intrusion features of the training landing pages, and is iteratively tested on the intrusion features of the testing landing pages. The training and testing continues until the occurrence of a cessation event. An association of feature weights and intrusion features that are derived from the iterative training and testing are stored in the classification model in response to the cessation event.

In another implementation, a system includes a scoring engine including software instructions stored in computer readable medium and executable by a processing system. Upon execution, the processing system identifies a landing page associated with sponsored content and identifies intrusion features of the landing page. A feature score for the landing page is generated based on the identified intrusion features, and if the feature score for the landing page exceeds a feature threshold, the landing page is classified as a candidate landing page. The candidate landing page can be provided to a malware detector to determine whether malware is present in the landing page. In some implementations, a sponsor account associated with the candidate landing page can be suspended. In some implementations, an advertisement associated with the candidate landing page can be suspended.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
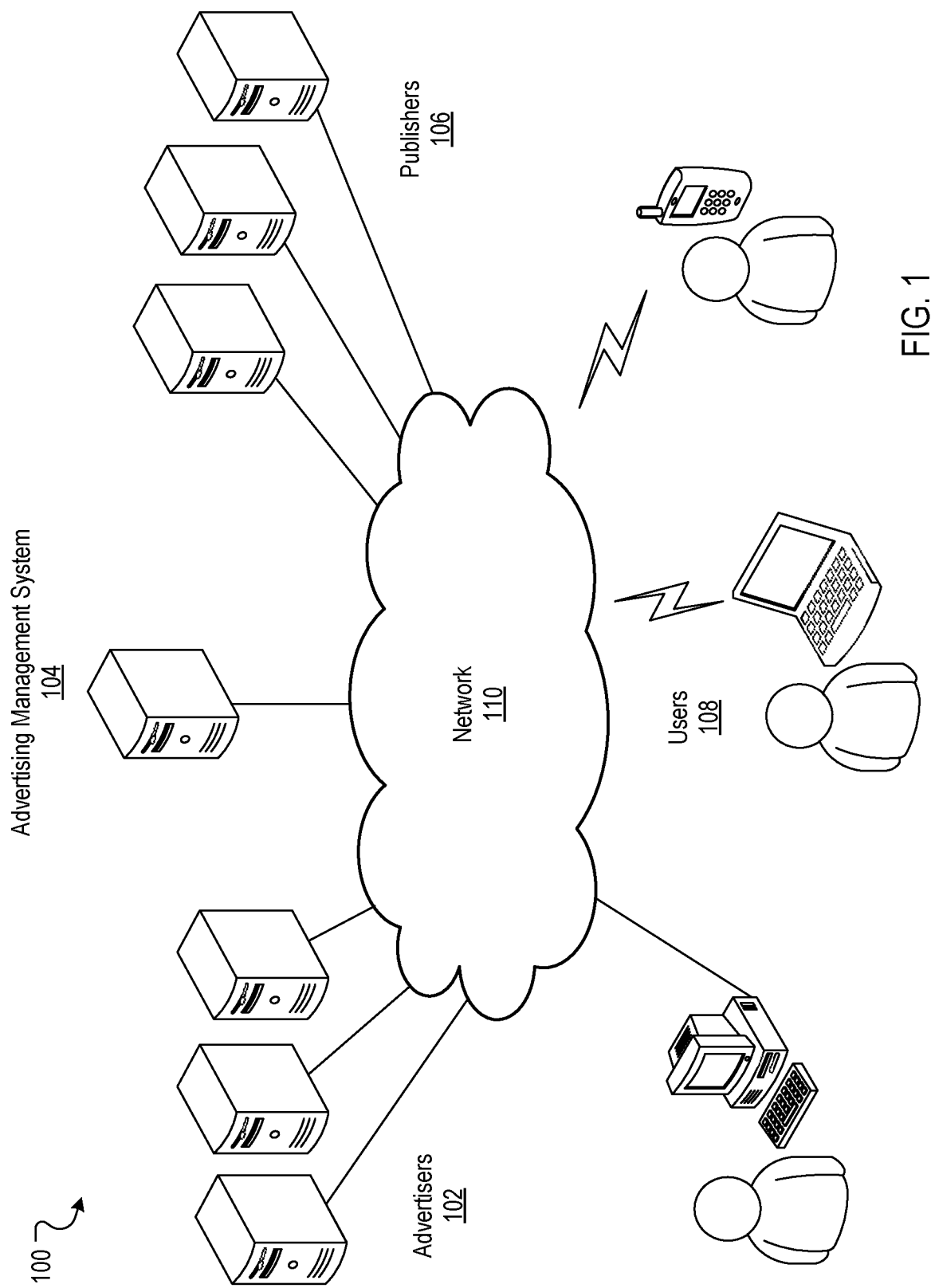
FIG. 1 is a block diagram of an example online advertising system.

FIG. 1 is a block diagram of an example online advertising system 100. In some implementations, one or more advertisers 102 can directly, or indirectly, enter, maintain, and track advertisement ("ad") information in an advertising management system 104. Though reference is made to advertising, other forms of content, including other forms of sponsored content, can be delivered by the system 100. The ads may be in the form of graphical ads, such as banner ads, text only ads, image ads, audio ads, video ads, ads combining one of more of any of such components, etc. The ads may also include embedded information, such as a links, meta-information, and/or machine executable instructions. One or more publishers 106 may submit requests for ads to the system 104. The system 104 responds by sending ads to the requesting publisher 106 for placement on one or more of the publisher's web properties (e.g., websites and other network-distributed content). The ads can include embedding links landing pages, e.g., pages on the advertisers 102 websites, that a user is directed to when the user clicks an ad presented on a publisher website.

Other entities, such as users 108 and the advertisers 102, can provide usage information to the system 104, such as, for example, whether or not a conversion or click-through related to an ad has occurred. This usage information can include measured or observed user behavior related to ads that have been served. The system 104 performs financial transactions, such as crediting the publishers 106 and charging the advertisers 102 based on the usage information.

A computer network 110, such as a local area network (LAN), wide area network (WAN), the Internet, or a combination thereof, connects the advertisers 102, the system 104, the publishers 106, and the users 108.

One example of a publisher 106 is a general content server that receives requests for content (e.g., articles, discussion threads, music, video, graphics, search results, web page listings, information feeds, etc.), and retrieves the requested content in response to the request. The content server may submit a request for ads to an ad server in the system 104. The ad request may include a number of ads desired. The ad request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the ads provided by the system 104. This combined content and ads can be sent to the user 108 that requested the content for presentation in a viewer (e.g., a browser or other content display system). The content server can transmit information about the ads back to the ad server, including information describing how, when, and/or where the ads are to be rendered (e.g., in HTML or JavaScript™).

Another example publisher 106 is a search service. A search service can receive queries for search results. In response, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999. Search results can include, for example, lists of web page titles, snippets of text extracted from those web pages, and hypertext links to those web pages, and may be grouped into a predetermined number of (e.g., ten) search results.

The search service can submit a request for ads to the system 104. The request may include a number of ads desired. This number may depend on the search results, the amount of screen or page space occupied by the search results, the size and shape of the ads, etc. In some implementations, the number of desired ads will be from one to ten, or from three to five. The request for ads may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search service can combine the search results with one or more of the ads provided by the system 104. This combined information can then be forwarded to the user 108 that requested the content. The search results can be maintained as distinct from the ads, so as not to confuse the user between paid advertisements and presumably neutral search results. Finally, the search service can transmit information about the ad and when, where, and/or how the ad was to be rendered back to the system 104.

As can be appreciated from the foregoing, the advertising management system 104 can serve publishers 106, such as content servers and search services. The system 104 permits serving of ads targeted to documents served by content servers. For example, a network or inter-network may include an ad server serving targeted ads in response to requests from a search service with ad spots for sale. Suppose that the inter-network is the World Wide Web. The search service crawls much or all of the content. Some of this content will include ad spots (also referred to as "inventory") available. More specifically, one or more content servers may include one or more documents. Documents may include web pages, email, content, embedded information (e.g., embedded media), meta-information and machine executable instructions, and ad spots available. The ads inserted into ad spots in a document can vary each time the document is served or, alternatively, can have a static association with a given document.

In one implementation, the advertisement management system 104 may include an auction process to select advertisements from the advertisers 102. The advertisers 102 may be permitted to select, or bid, an amount the advertisers are willing to pay for each click of an advertisement, e.g., a cost-per-click amount an advertiser pays when, for example, a user clicks on an advertisement. The cost-per-click can include a maximum cost-per-click, e.g., the maximum amount the advertiser is willing to pay for each click of advertisement based on a keyword, e.g., a word or words in a query. Other bid types, however, can also be used. Based on these bids, advertisements can be selected and ranked for presentation.

In some implementations, the system 104 includes an ad page malware detection system that can determine the likelihood that sponsored content (e.g., an ad's landing page) contains malware. Malware may include any type of computer contaminant, such as dishonest adware, computer viruses, spyware, Trojan horses, computer worms, or other such malicious, unelected and/or unwanted software. Specifically, malware can include any suspicious software installation that happens automatically upon landing on a webpage, such as an ad's landing page. In some implementations, the ad page malware detection system may cover the case where a user must click a link on the page (such as "free download") for the malware to be installed. The software, however, need not take malicious action to be malware; any software that is intrusively installed can be considered malware, regardless of whether the actions taken by the software are malicious. Thus, in addition to Trojan Horses, viruses, worms, and browser exploits, other software that does not necessarily harm a computer system, such as monitoring software, start page hijacks, etc., can be considered malware.

The malware detection system can, for example, automatically test landing pages (e.g., a web page defined by a URL embedded or associated with sponsored content) for malware and take appropriate action when malware is detected. Such actions may follow pre-determined policies, such as to suspend an advertiser's account (e.g., an advertiser's account with Google AdSense or AdWords), "flag" the ad or ads associated with the landing page as malware-related, and help the end-user avoid the negative effects of such ads in the future. The malware detection system can provide a process for an advertiser to have its "flagged" ads re-checked and its accounts unsuspended. Moreover, if the malware detection system re-checks the landing pages of an advertiser's flagged ad or ads and determines that the associated landing pages are clean (e.g., free from malware), the advertiser's account can be reinstated (or cleared). In some implementations, the ads associated with the landing page can be suppressed completely, e.g., serving of the ad can be precluded.

In some implementations, the malware detection system may have the flexibility to suspend groups of ads, such as all ads in an ad group or ad campaign, or all ads with a common URL. For example, the malware detection system may determine that only a subset of an advertiser's ads contain malware, and thus suspend only those ads. Such determination may be based on common features shared by the ads' landing page.

Malware may be encountered in an ad's landing page or redirect chain, or may originate in various ways. Specifically, the redirect chain can include the series of URLs that include the clicked ad (or destination URL), URLs that are instantiated by scripts, etc., as a result of the click on the ad, and the final URL of the ad's landing page. In some cases, an advertiser's site can be hacked and malware inserted directly onto the landing page. In another example, a malicious advertiser may purposely install or enable malware on its ad landing page. In a third example, a click-tracker can insert malware through the chain of redirects before the final URL is reached. In a fourth example, an advertiser may install ads and/or gadgets on its landing page that may be populated by third parties who insert malware. In these and other examples of malware, when a user clicks such an ad, the user's computer can be compromised by the installation of intrusive software.

Figure 2:
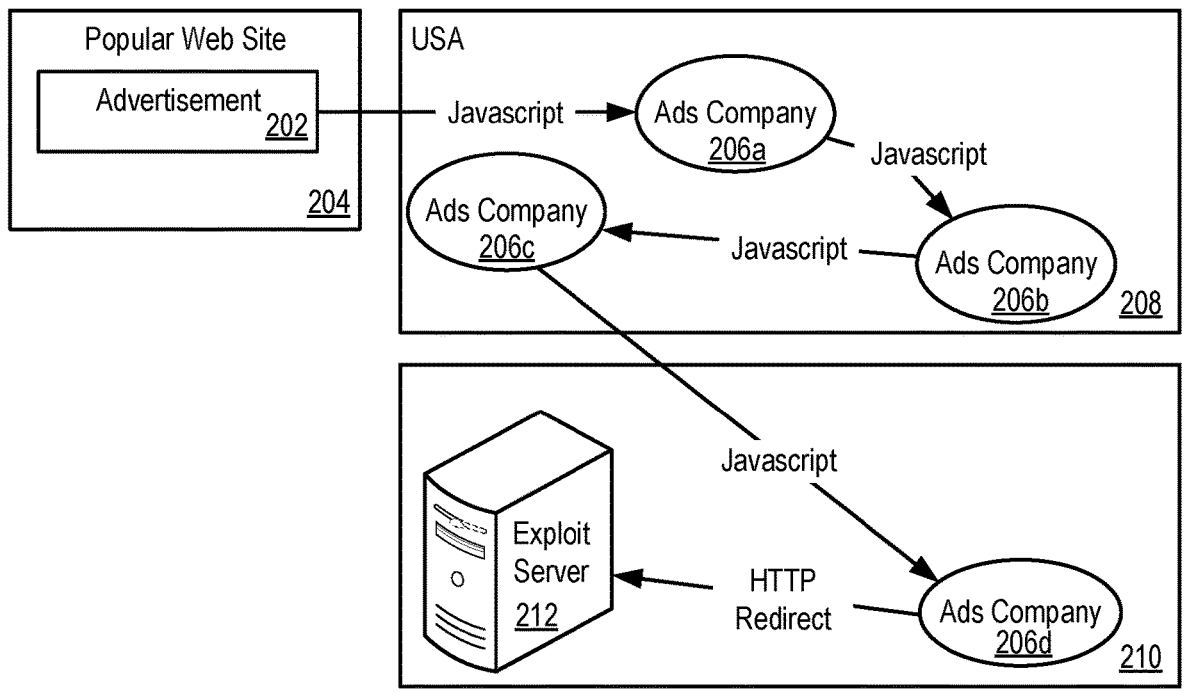
FIG. 2 is a flow diagram of an example sub-syndication of sponsored content.

For example, FIG. 2 is a flow diagram of an example sub-syndication of sponsored content. Consider an advertisement 202 on a popular web site 204. For example, the web site or web page in question may include a banner advertisement from a reputable advertising company 206a. The user may click on the advertisement 202, for example, in a web browser executing on the user's home computer, PDA, or the like. The destination URL of the advertisement 202 may point to or initiate a single line of script (e.g., a first JavaScript) that references the ads company 206a in a first geographic region 208. The first JavaScript in turn may generate second JavaScript to redirect through the URL of an ads company 206b (e.g., another advertising company). The second JavaScript in turn may generate yet more JavaScript pointing to another ads company 206c that may, for example, use geo-targeting for its ads. The geo-targeted ad may result in a single line of HTML containing an iFrame pointing to an ads company 206d in another geographic region 210.

When trying to retrieve the iFrame, the browser may be redirected, such as via a Location header, towards an IP address of an exploit server. For example, the IP address may be, for example, of the form xx.xx.xx.xx/<exploit server>/, such as the IP address of an exploit server 212. The IP address served can include encrypted JavaScript which may enable the exploit server 212 to attempt multiple exploits against the user's browser. As a result, several malware binaries may be installed on the user's computer. The malware encountered and/or installed in this scenario may be unknown to the initial ads company 206a. However, each redirection from the destination URL (e.g., ads company 206a) to the landing page associated with sponsored content (e.g., on the exploit server 212) can give another party control over the content on the original web page. In this way, the sub-syndication of sponsored content, characterized here by several URL redirects, can lead a user to an undesired encounter with malware.

Detecting malware may include the use of commercially available malware detection software or other such virus scanning software or systems. Malware may also be detected by monitoring system behaviors, such as monitoring the use of registry and system files after visiting a URL. For example, an intrusion detection engine may monitor the behavior of a browser on a virtual machine to determine whether malware is present.

Figure 3:
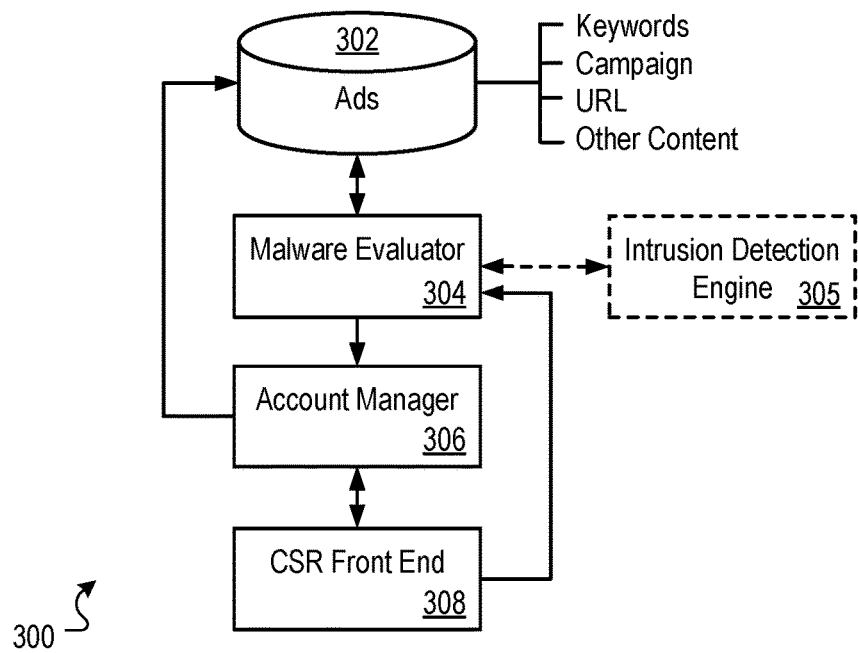
FIG. 3 is a block diagram of an example sponsored content processing system.

FIG. 3 is a block diagram of an example sponsored content processing system 300. Data related to the sponsored content can be stored in an ads data base 302. For example, the ads data base 302 may contain several forms of sponsored content, such as graphical ads, banner ads, text only ads, image ads, audio ads, video ads, ads combining one of more of any of such components, etc. The ads may be organized, for example, by keyword, ad campaign, URL or other content.

The system 300 includes a malware evaluator 304 that can be used to detect malware in a landing page associated with an ad, or in the ad itself. For example, the malware evaluator 304 may initially evaluate an ad's landing page for its likelihood to include malware, and if the landing page is considered likely to include malware, the malware evaluator 304 can submit the ad to a more thorough evaluation process. Such a two-step evaluation process can lead to efficiencies gained by using the more thorough malware evaluation process only on the candidate ads considered most likely to include malware.

The initial evaluation performed by the malware evaluator 304 may identify intrusion features of the ad's landing page or URLs in the redirect chain. The evaluation may inspect the ad for iFrame features, URL features, script features, etc. and compare such features against a repository of features that are known to be associated with landing pages that include malware. As a result of initial evaluation of the ad's landing page features, the malware evaluator 304 may generate a feature score that indicates the likelihood that the ad's landing page includes malware. For example, a higher score may mean that the ad's landing page is more likely to include malware. Any ads' landing pages having a feature score that exceeds a feature threshold can be classified as candidates for a more thorough malware evaluation process. In this way, the identification of features can facilitate reduction heuristics, allowing the system to significantly reduce the number of landing pages to a smaller set of candidate landing pages that may be subsequently evaluated by the more thorough malware evaluation process.

In some implementations, the malware evaluator 304 can use an intrusion detection engine 305 that implements a more thorough malware evaluation process. For example, the malware evaluator 304 can provide the intrusion detection engine 305 with a web page (e.g., the landing page of an ad) and receive an intrusion score for the web page. In other implementations, the malware evaluator 304 can include the intrusion detection engine 305.

The more thorough process can be initiated by the malware evaluator 304 when the malware evaluator submits the candidate landing page to the intrusion detection engine 305. The intrusion detection engine 305 may include, for example, a virtual machine via which the system 300 can load the ad in a browser, navigate to the ad's landing page (e.g., via one or more URL redirects), and execute one or more malware detection systems, such as commercially available computer malware and virus detection systems. During the process, the virtual machine also can, for example, monitor the use of system files and the creation of unauthorized processes. The intrusion detection engine 305 can generate an intrusion score and provide the intrusion score to the malware evaluator 304. The intrusion score can indicate the level of malware in the ad's landing page. If the intrusion score is sufficiently high, such as above a predefined intrusion threshold, the system 300 can flag the ad (e.g., in the ads data base 302) as being likely to contain malware in its landing page.

Ads that are flagged in the ads data base 302 may be precluded from being served to users, or the ads may be annotated in some way to indicate their likelihood of the ad's landing page including malware. In some implementations, the annotations may include an intrusion score that rates each of the ads' likelihood to be malware-related. As the result of determining that any part of an advertiser's sponsored content (e.g., a single ad's landing page) includes malware, the system 300 may flag some or all of the advertiser's ads. The system 300 may also suspend the account of the advertiser, such as to prevent the advertiser from submitting new ads. The system 300 may perform some actions automatically, such as when it is clear that ads are malware-related, e.g., a relatively high intrusion score. Other actions may be based on user decisions, such as after reviewing the results of malware evaluations.

An account manager 306 can receive the results of malware evaluations from the malware evaluator 304. The evaluations may include, for example, the sponsor's account information, the URLs of the destination and landing pages and any pages in the redirect chain. The evaluations can also include information identifying the reasons that the malware evaluator 304 identified the ad as malware-related. A user of the account manager 306 may be able to facilitate manual disposition of ads and/or accounts based on the evaluation. For example, a user may be able to suspend the account for an advertiser if one or more of the advertiser's ad landing page are discovered to include malware. In another example, a user may decide to flag one or more ads in an advertiser's ad campaign.

A customer service representative (CSR) front end 308 can exist within the system 300 that allows advertisers to initiate an appeal process for flagged ads. For example, a customer (e.g., an advertiser) may have one or more landing pages corresponding to sponsored content that the malware evaluator 304 has determined include malware. After cleaning such sites from malware, for example, the advertiser may initiate an appeal of the ad. Such an appeal may be, for example, in a communication between the CSR front end 308 and the malware evaluator 304 and/or the account manager 306. The communication can include, for example, the advertiser's name and the URLs of the landing pages to be re-evaluated by the malware evaluator 304. If an advertiser's appeal of a flagged ad is successful, the system 300 can un-flag the ad. In some implementations, the system 300 may also reinstate the advertiser's account as the result of a successful appeal. In some implementations, when an advertiser appeals an ad, the system 300 can check all of the ads for the advertiser and only reinstate the advertiser's account (and un-flag the ad) if all of the advertiser's ads are clean.

In some implementations, the system 300 can include a tiered suspension account model. For example, based on the likelihood of the presence of malware in a landing page, the landing page can be categorized in various categories, or levels, of malware infection. Such categories may include, for example, "OK" (e.g., determined likely to be malware-free), "suspect" (e.g., may contain malware) or "confirmed" (e.g., very likely or certain to contain malware). The suspect category may be further categorized, such as with a rating based on an intrusion score.

In some implementations, malware detection scores may be accumulated with respect to an account, and an account itself can be "tiered" into risk categories, each of which is handled differently, ranging from automatic review, manual review, and automatic suspension. For example, the system 300 may automatically suspend an account when one or more ads are in the "confirmed" malware category, or may suspend an account when 5% or more of the ads are "suspect," etc.

In one implementation, for example, the malware evaluator 308 can identify landing pages associated with a sponsor account having features scores that exceed a feature threshold. The feature scores for these landing pages can be accumulated to obtain an account score, and a risk category can be assigned to the sponsor account based on the account score. One of several account remediation processes for the sponsor account can be selected based on the risk category, e.g., automatic review, manual review, automatic suspension, partial suspension of only candidate landing pages, etc.

Detection of potential malware can occur continuously, periodically, or aperiodically. For example, the ads database 302 can be continuously checked by the malware evaluator 304. In another example, the ads database 302 can be periodically checked by the malware evaluator, e.g., monthly or weekly. In yet another example, each advertisement that is added to the ads database 302 can be checked when the advertisement is added to the ads database 302. Other detection schedules can also be used.

Figure 4:
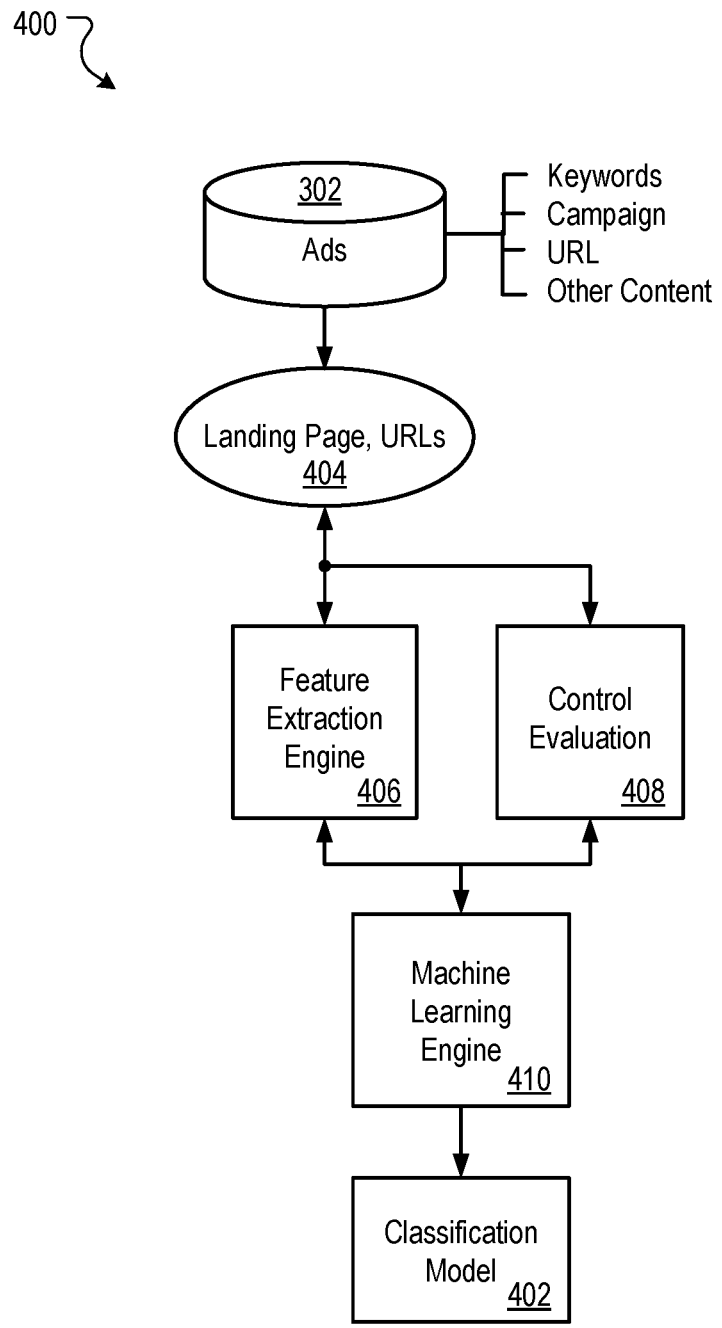
FIG. 4 is a block diagram of an example training process to build a classification model.

FIG. 4 is a block diagram of an example training process 400 to build a classification model 402. The classification model 402 can be used for evaluating features in a landing page associated with the ad, such as features that may indicate the likelihood that malware is present, e.g., small iFrames, obfuscated script, etc. In some implementations, the features may be assigned weights during the training process. Such feature-based evaluations may be used to reduce the number of URLs that are to be evaluated using a more robust evaluation process, such as a process implemented by the intrusion detection engine 305.

The training process 400 can be used to iteratively train the classification model 402 using intrusion features of the "training" landing pages content. At the same time, the process 400 can iteratively test the classification model 402 using intrusion features of the "testing" landing pages content. The iterative process 400 can continue until the occurrence of a testing cessation event, such as a determination that associations between the feature weights and intrusion features are stabilizing. Such a determination may be made, for example, by implementing a linear regression based model.

In an example general flow of the training process 400 for producing the classification model 402, processing can begin with the use of the ads 302. Information used for the training process 400 can be identified from the landing pages and URLs 404. The process 400 can further partition the landing pages and URLs 404 into "training" landing pages and "testing" landing pages. For example, a larger number of landing pages (e.g., 10,000) may be used as training examples to train the classification model 402, while a smaller number (e.g., 1,000) may be used to test the classification model 402.

A feature extraction engine 406 can extract features from the landing pages and URLs 404. The features can, for example, be indicative of the likelihood that a landing page associated with an ad includes malware. For example, one or more malware-related (or intrusion) features can correspond to small iFrames that may be indicative of an attempt to embed other HTML documents (e.g., malware-related) inside a main document. Another example of an intrusion feature is a bad or suspicious URL, such as a URL that matches a URL on a known list of malware-infected domains. A third example of an intrusion feature is suspicious script language. For example, JavaScript or other scripting languages may have certain function calls or language elements that are known to be used in serving malware. Several other types of intrusion features may exist, such as the existence of multiple frames, scripts or iFrames appearing in unusual places (e.g., after the end of the HTML), or any other features that the training process 400 determines over time is a marker for likely malware infections.

In some implementations, the feature extraction engine 406 can include a list of features that are weighted. For example, a particular intrusion feature for a URL that is a known malware site may receive a higher weight than an intrusion feature that is less likely to be associated with malware. The weights of features may be adjusted over time as the classification model 402 is used to classify landing pages as to their likelihood of including malware.

Weights may be cumulative, so that the overall likeliness that a landing page includes malware may be determined by adding, or otherwise combining the weights corresponding to the features detected. In some implementations, a feature's weight can be included in the sum for each occurrence of the corresponding feature that may be detected in a landing page. In other implementations, a feature's weight may be added to the total score once, regardless of the number of occurrences of the feature in the ad. Other evaluations based on feature weights can also be used.

While many features may have a corresponding positive weight, other features may have a negative weight. For example, feature A, (e.g., corresponding to a likely malware-related function call), may have a weight of 2.5. At the same time, the presence of feature X may partially negate the likelihood that feature A is malicious, prompting the system 400 to assign a negative weight to feature X.

A control evaluation 408 can be used in the training phase of the training process 400. The control evaluation 408 can include a human evaluation of ad landing pages. For example, the human review of the landing page for a particular ad may include an examination of the ad's features. The review may also provide an overall rating of the landing page's likelihood of including malware, such as extremely malware infected, semi-malware infected, etc.

The information generated by the control evaluation 408 can be referenced during a training phase that assigns feature weights to the features extracted by the feature extraction engine 406. For example, a machine learning engine 410 can assign features weights to the features to test the results of the control evaluation 408, for example, by examining similar features in other URLs (e.g., URLs from the "testing" landing pages). Specifically, the machine learning engine 410 can use features from the testing landing pages to iteratively refine the associations of feature weights and intrusion features.

Such refinement can be realized, for example, by a linear-regression based model. For example, the machine learning engine 410 may use training and testing landing pages partitioned in the landing pages and URLs 404. The machine learning engine 410 may, for example, adjust the feature weights based on the training and testing landing pages to generate feature scores for the testing landing pages. If the feature scores yield malware detection results that are close to the control evaluation results, the classification model can be considered trained. Conversely, if the feature scores yield malware detection results that are substantially different that the control evaluation results, the machine learning engine 410 can readjust the feature weights. For example, over several iterations the machine learning engine 410 may determine that feature X is weighted too high, and may thus decrease the feature weight associated with feature X.

The iterative training and testing of the classification model 402 on intrusion features of the training and testing landing pages can continue until the occurrence of a testing cessation event, e.g., a convergence of test results to the control evaluation 408, or until an iteration limit is reached. After the cessation event, the association of feature weights and intrusion features can be persisted in the classification model 402.

Other processes to train the classification model 402 can also be used.

Figure 5:
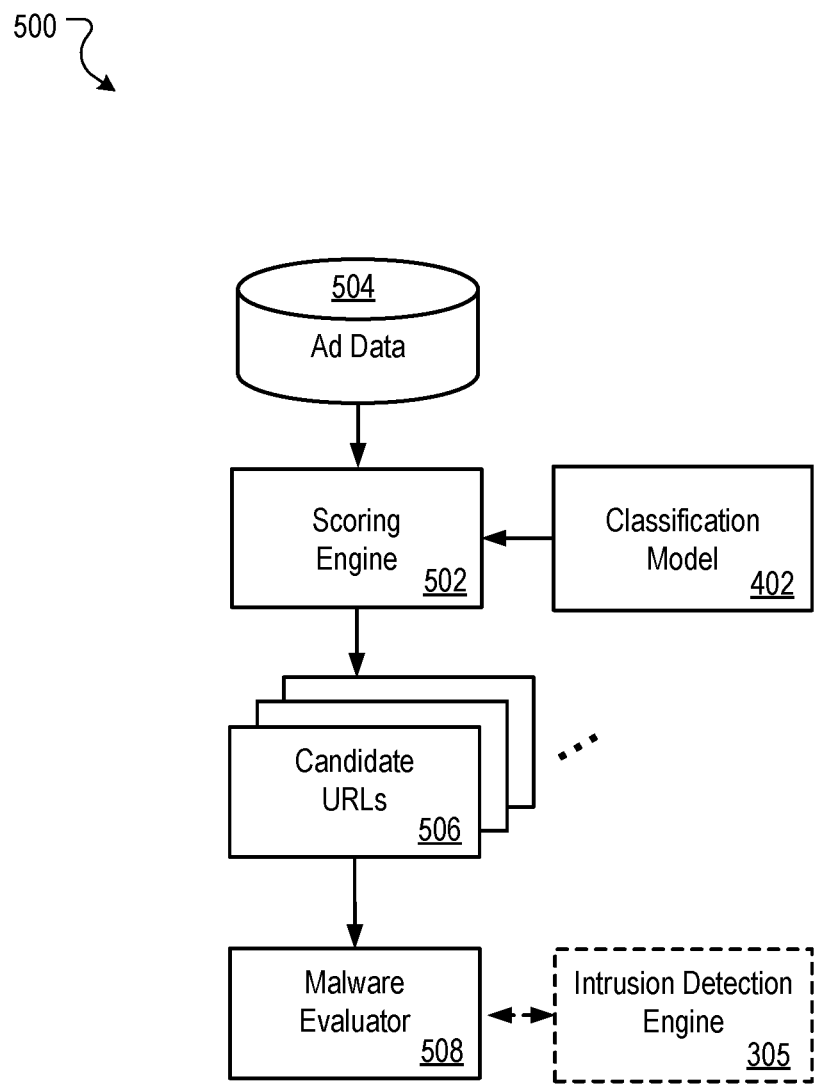
FIG. 5 is a block diagram of another example sponsored content processing system that utilizes the classification model.

FIG. 5 is a block diagram of another example sponsored content processing system 500 that utilizes the classification model 402. The system 500 includes a scoring engine 502 that uses the classification model 402 to score ads from an ad data base 504. For example, using the feature weights stored in the classification model 402, the scoring engine 502 can score features of ads' landing pages it processed from the ad data base 504. Any ads that are scored above a pre-defined threshold can be identified as candidate URLs 506.

The candidate URLs 506 can include information associated with the ad that may be needed for a thorough examination by a malware evaluator 508. For example, the candidate URLs 506 can include the ad's URL and account information of the advertiser that supplies the sponsored content. The ad's URL (or some other identifier for the ad) may be used, for example, to identify additional information for the ad in the ad data base 504 that may be needed by the malware evaluator 506. The ad's URL may also be used by the malware evaluator 506 to simulate selection of the ad in a user's browser. For example, the malware evaluator 506 can provide the landing page to the intrusion detection engine 305 which may load the URL into a virtual machine that includes virus detection software and that monitors the use of system files and the creation of unauthorized processes.

In some implementations, when the malware evaluator 508 determines that a candidate URL is infected with malware (e.g., based on a high intrusion score received from the intrusion detection engine 305), other related candidate URLs 506 may be assigned a similar score. For example, it may be clear that candidate URLs 506 having the same domain name are also just as likely to be infected. Such determination may be partially based on geographical factors, e.g., if the domain is from Russia, China or any other country statistically known to have higher rates of infected domains.

Figure 6:
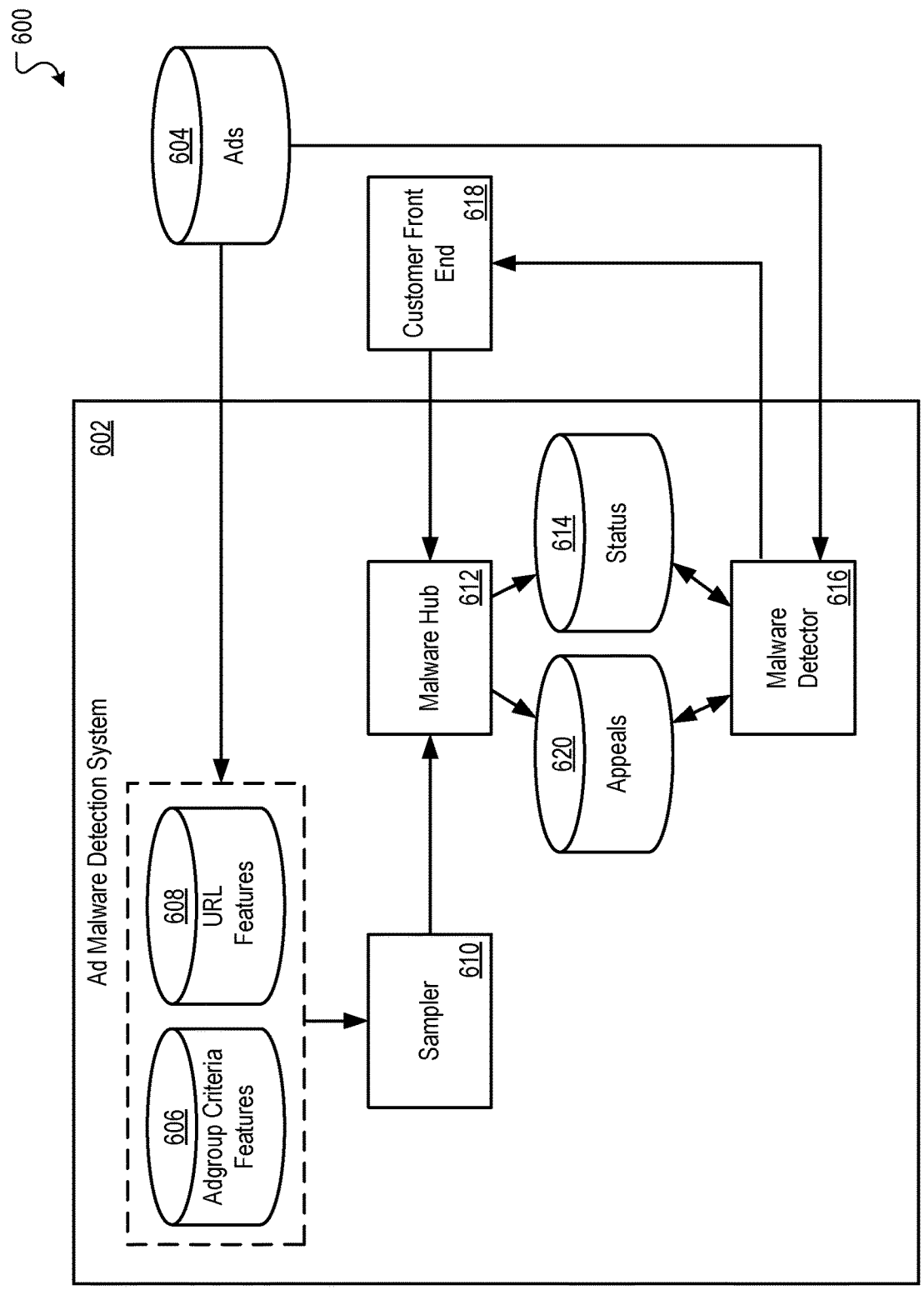
FIG. 6 is a block diagram of another example sponsored content processing system.

FIG. 6 is a block diagram of another example sponsored content processing system 600. The system 600 includes an ad malware detection system 602 that can detect the likelihood of malware associated with advertisements in the ads database 604. The ad malware detection system 602 can also facilitate an appeal process by which advertisers may request the re-evaluation of ads that have been flagged as being associated with malware. In some implementations, the ad malware detection system 602 can comprise software instructions that execute continuously, for example, to use information from the ads 604 to identify malware in ads' landing pages on an ongoing basis. For example, the identification process may involve monitoring system behaviors, such as monitoring the use of registry and system files after a user visits a URL. In another example, the identification process may involve a scheduled examination of each advertiser's landing page URLs, or may involve one or individual landing page URLs that are considered likely to contain malware. Such processes can monitor for particular ad landing page features that may indicate the likelihood that malware is present. In other implementations, one or more components of the ad malware detection system 602 may be used in a brute force process to crawl the ads database 604 to examine landing page URLs for possible associations with malware. The determination that ads have associated malware may be based on individual ads, groups of ads, keywords, one or more related URLs, groups of ads within an advertiser's account, or some combination thereof.

In an implementation, information from the ads database 604 can be provided to an adgroup criteria features data base 606 and a URL features database 608. For example, the information in the databases 606 and 608 can include pertinent information from the ads, such as the URLs, keywords from the ads, the names of the associated advertisers, the account information of the advertisers, and the like. Provisioning of this information can, for example, obviate the need to store images, video, audio or other such ad-related information. Having the ad information local to the adgroup criteria features data base 606 and the URL features data base 608 can also provide the advantage of organizing and/or indexing the data for more efficient use within the ad malware detection system 602. Such information stored in the databases 606 and 608 can be sufficient to determine malware feature-based associations with a particular ad without having to crawl the ad's landing page. In another implementation, the system 600 can crawl the landing pages of ads and use the information available from the landing pages instead of (or in addition to) using the databases 606 and 608.

The adgroup criteria features data base 606 can contain information for one or more adgroups for an advertiser, keywords associated with the ads, product categorization information, account information for the advertiser, and other ad-related information used by the ad malware detection system 602. The URL features database 608 can contain the URL (e.g., the landing page URL) of each individual ad, the name of the advertiser, and any other information or indexes that may allow associated data in the adgroup criteria features data base 606 to be accessed.

The ad malware detection system 602 includes a sampler 610 that can serve as a first filter in identifying ads that may contain malware. Specifically, the sampler 610 can identify ads for which malware detection is recommended. The identification process can use ad-related information stored in the adgroup criteria features data base 606 and the URL features database 608. For example, the sampler 610 may search an ad for any of a set of per-determined ad content features identified in the adgroup criteria features data base 606.

The sampler 610 may use the classification model 402 described in reference to FIG. 4. For example, the sampler 610 may compare features of ads it processes from the data bases 606 and 608 with weighted features represented in the classification model 402. Based on the cumulative or combined feature weights of one or more features in an ad's landing page, the sampler 610 may determine that the ad's landing page exceeds a feature threshold. As such, the URL of the ad can be considered a candidate URL for more thorough malware detection.

In some implementations, the URL features database 608 may include obfuscation information that an obfuscation detector in the sampler 610 may use to screen HTML pages for obfuscated scripts, such as scripts written in JavaScript, VBScript, and the like. Such scripts can often contain an apparently gibberish collection of characters that, when the ad is clicked by the user, will rewrite itself to another URL string, then again to yet another string, and so on until the exploit code is written or downloaded onto a computer device. This level or re-writing that can occur along the redirect chain can make it difficult to identify the malicious HTML code.

In some implementations, the URL features database 608 may include Geo-location information. Such information may be used, for example, to geographically categorize the URLs used for ads. Often malware may be provided from certain countries, and thus analyzing the location information of embedded links may help in identifying a potential malware site. For example, a US-.com domain have an iFrame to a site in a geographically remote location known for a high incidence of malware may provide a strong signal of potential malware.

When the sampler 610 has identified candidate ads that are suspected to contain malware, the sampler 610 can send the candidate URLs and account information to a malware hub 612. The malware hub 612 can serve as a central interface for receiving ads to be more thoroughly checked for malware, and as will be described below, for receiving appeals for ads flagged as containing malware. For any ad that the malware hub 612 is requested by the sampler 610 to review, the malware hub 612 can update a status database 614 with the ad's URL and corresponding tracking information, such as the account information of the advertiser associated with the ad. In some implementations, the information stored in the status database 614 can include information that the sampler 614 considered the reason for the more advanced malware detection. In some implementations, the reasons may be used to group ad statuses in the status database 614 in order to group them for more efficient processing.

In some implementations, the sampler 610 can also evaluate the relative age of domains and URLs for (or links to) those domains. The age of a domain can be used to identify suspected malware sites, as malware is often distributed from new sites. For example, new distribution sites are constantly being created and may exist for only several weeks before the sites are taken down. To determine the age of domains, the sampler 610 may use public or private lists of recently-activated domain names that may be available, for example, from domain registry clearing houses.

In some implementations, the malware hub 612 may serve as a central interface for receiving ad malware detection requests from other advertising management systems 104. For example, while the ad malware detection system 602 may be a component of Google's AdSense system, competing advertising management systems 104 may pay a fee to have ads under their control screened for malware. As such, the ad malware detection system 602 may serve as a clearinghouse for malware detection for several advertising management systems 104.

A malware detector 616 can process the ads represented by entries in the status database 614. For example, the malware detector 616 may process one or more ads, using the URL and the account ID for each ad. If additional information for an ad is needed (e.g., that is not stored in the status database 614), the malware detector 616 can pull additional information for the ad from the ads database 604. Such information may include, for example, account information, or portions of the ad itself that may not have been provided to the sampler 610 for the initial first-filter screening.

The malware detector 616 can then cause a more thorough screening to be performed. In addition, the malware detector 616 can submit the URL to an intrusion detection engine, e.g., intrusion detection engine 305, that performs a more detailed malware evaluation, such as closely examining the "destination" URL, "final" URL, URLs in the redirect chain, and the ad's landing page (e.g., identified by the final URL).

The malware detector 616 may receive an intrusion score for the destination URL from the intrusion detection engine 305. For each landing page with an intrusion score above a pre-defined threshold, the ad malware detection system 602 can take one or more predefined actions, such as automatically flagging ads as malware-related and suspending the account for an advertiser, or providing such information to a user who may manually suspend the accounts of malicious advertisers and/or block their ads. The intrusion score threshold that the malware detector 616 may apply may be set conservatively high so as not to produce significant false positives.

In some implementations, an intrusion detection engine can be implemented or integrated with the malware detector 305.

Actions that occur when ad malware is detected can follow a pre-defined policy. For example, the advertiser's account may be suspended manually, and the advertiser may be notified. The ad associated with malware can be flagged to avoid serving the ad to users. The malware detector 616 may provide information regarding flagged ads, suspended accounts and the like to the status database 614. In some implementations, a process may run on a regular basis to use such information in the status database 614 to update the ads database 604.

A customer front end 618 can serve as a graphical user interface (GUI) for a user, e.g., a customer service representative, to review any results of ad malware detections performed by the malware detector 616. For example, the results may list instances of specific landing pages and the reasons they are determined to contain malware. The instances may be grouped or sorted in various ways, such as by advertiser account, URL, etc.

An appeal process can allow the advertiser having a flagged ad to have the ad re-checked by the ad malware detection system 602. For example, the advertiser may rid the ad's final URL, or all URLs in the redirect chain, of malware after being notified that the ad's landing page contains malware, and then contact a customer service representative as part of the appeal process. The customer service representative can utilize the customer front end 618 to send appeal requests to the malware hub 612. Each appeal request can represent one or more ads for which the advertiser requests the ad malware detection system 602 to re-evaluate for malware content. For example, if the ad malware detection system 602 has previously flagged the advertiser's ad as malware-related, and the advertiser has cleaned the landing page URL(s) associated with the ad, the request may be to re-evaluate that specific ad.

The malware hub 612 can receive the appeal request and update an appeals data base 620. Specifically, pending and completed appeal requests may be stored in the appeals data base 620. The information for each ad stored in the appeals data base 620 may include, for example, the advertiser name, the advertiser's account information, the URL(s) associated with the ad's landing pages and URLs in the redirect chain, and any other information that may be used to process the appeal.

To process as appeal, the malware detector 616 may use a process similar to the process described above to initially evaluate an ad's landing page for malware. In some implementations, the appeal process may also automatically include the re-evaluation of the landing pages of all ads for the advertiser, all ads in an ad group, or any other such grouping that may be used to search for other malware-related ads that the advertiser may have.

When processing an appeal, the malware detector 616 may use information for each ad that is stored in the appeals database 620. The malware detector 616 may use a similar process as described above to evaluate an ad's landing page, generate an intrusion score, and apply a threshold to determine if the ad's landing page is likely to have been cleared of malware. The results of ad landing page re-evaluations can be stored in the appeals data base 620. In some implementations, a process may run on a regular basis to use such information in the appeals data base 620 to update the ads database 604.

In one example scenario of a malware appeal, a customer may receive a notification, such as an email, stating that the customer's account has been suspended for malware. The notification may include details of where malware was found (e.g., destination URL, account information, etc.). The notification may also provide advice on how to remove the malware, and may direct follow-ups, for example, with malware customer support representatives. The customer may then clean their landing page and/or other URLs associated with the malware, and use the customer front end 618 to initiate the appeal process. If the malware detector 616 determines that the ad's landing page is now free of malware, the customer may receive a notification that the appeal was successful and that the account is now reinstated. However, if the malware detector 616 determines that the ad's landing page still includes malware, the customer may receive a notification that the appeal was denied, including detailed information about the malware detected. In some implementations, the notification process for malware detections and appeal results may be accomplished in groups, for example, such as not to overwhelm the customer with a high number of email notifications.

In some implementations, ads associated with a sponsor account are precluded on a per-ad basis, e.g., only ads having an intrusion score that exceeds an intrusion threshold are precluded from being served. Upon an appeal, the candidate landing page is re-submitted to the intrusion detection engine, and another intrusion score for the candidate landing page is received from the intrusion detection engine. The ad remains suspended or is reinstated depending on the intrusion score received during the appeal.

In some implementations, ads associated with a sponsor account are precluded on a per-account basis if any one ad in the account is determined to have an intrusion score that exceeds the intrusion threshold. Upon an appeal, all ads in the sponsor account are identified and checked for malware. The account remains suspended if any one of the landing pages associated with the sponsor account is determined to have an intrusion score that exceeds the intrusion threshold.

Figure 7:
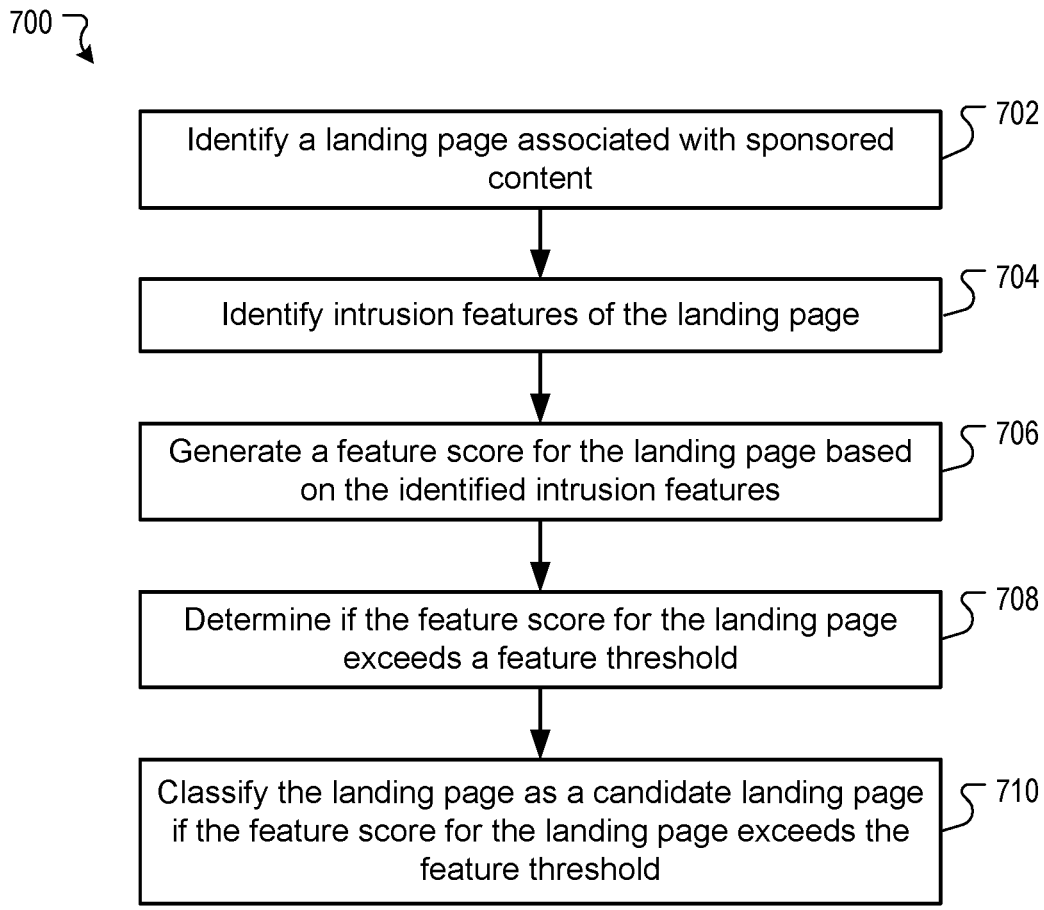
FIG. 7 is a flow diagram of an example process for identifying a candidate landing page for intrusion detection.

FIG. 7 is a flow diagram of an example process 700 for identifying a candidate landing page for intrusion detection. For example, the process 700 may be implemented using software instructions stored in a computer readable medium and executed by a processing system. The candidate landing pages identified by the process 700 may be identified by the scoring engine 502 (see FIG. 5) and used by the malware detector 508. Such candidate pages can be a significantly smaller number of pages than the total collection of landing pages that the process 700 uses to identify candidate landing pages.

Stage 702 identifies a landing page associated with sponsored content. For example, the landing page may be the landing page for an ad that a user may see in a web browser after clicking on an ad. In general, the context of "landing pages" can include any content or headers, including redirects that may be encountered or seen by the user of a web browser following an ad click.

Stage 704 identifies intrusion features of the landing page. For example, the process 700 may use the scoring engine 502 in FIG. 5 to identify landing page features, such as one or more iFrame features, one or more URL features, and/or one or more script features. In another example, the sampler 610 described in reference to FIG. 6 may identify features from the adgroup criteria features data base 606 and the URL features database 608.

Stage 706 generates a feature score for the landing page based on the identified intrusion features. For example, the scoring engine 502 (see FIG. 5) may generate a feature score for an ad's landing page from the ad data base 504 using weighted scores from the classification model 402. In another example, the sampler 610 may generate a feature score based on features from the ad's landing page used from the features data base 606 and the URL features database 608.

Stage 708 determines if the feature score for the landing page exceeds a feature threshold. For example, the scoring engine 502 may determine if the feature score generated for the ad's landing page exceeds a pre-defined feature threshold. In another example, the sampler 610 may determine if the feature score generated for the ad exceeds a pre-defined feature threshold. Feature thresholds may be a numeric, for example. In some implementations, different feature thresholds may exist for different tiers of advertisers, such as tiers based on malware risk. For example, advertisers who are known to have little or no malware-related ads may have a higher threshold; or advertisers may request to have a lower threshold established in order to identify potential infected ads more easily to guard against a poor customer experience; etc.

Stage 710 classifies the landing page as a candidate landing page if the feature score for the landing page exceeds the feature threshold. For example, if the scoring engine 502 determines that the feature score generated for the ad's landing page exceeds the pre-defined feature threshold, the scoring engine 502 can output the corresponding candidate URLs 506. In another example, if the sampler 610 determines that the feature score generated for the ad's landing page exceeds the pre-defined feature threshold, the sampler 610 can provide the candidate URL to the malware hub 612.

Figure 8:
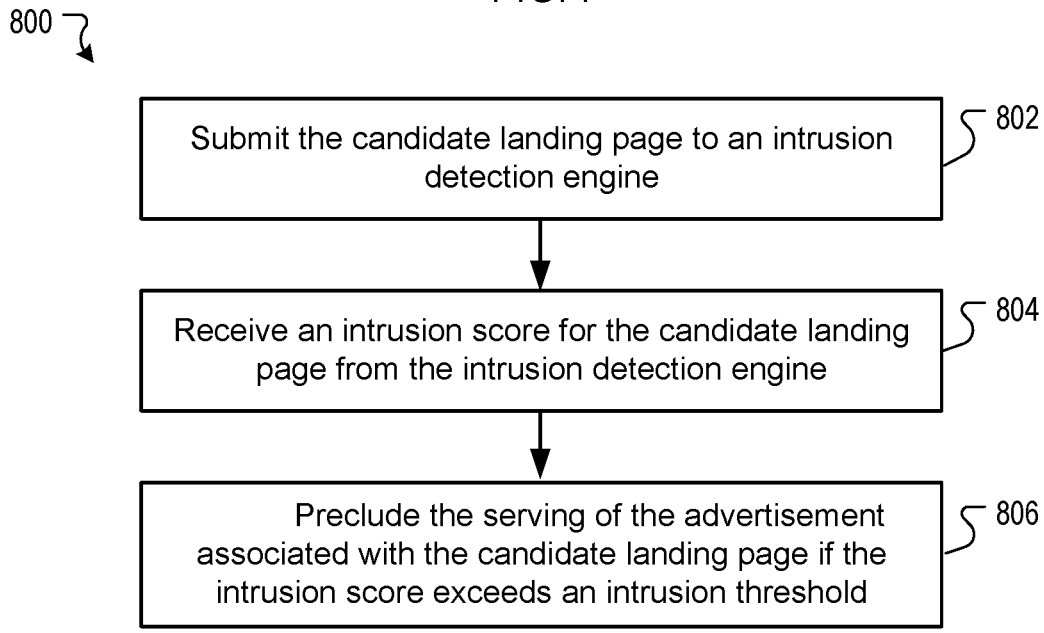
FIG. 8 is a flow diagram of an example process for submitting a candidate landing page to an intrusion detection engine.

FIG. 8 is a flow diagram of an example process 800 for submitting a candidate landing page to an intrusion detection engine. For example, the candidate landing page submitted by the process 800 may be identified by the process 700. The process 800 may be implemented using software instructions stored in a computer readable medium and executed by a processing system.

Stage 802 submits the candidate landing page to an intrusion detection engine. For example, referring to FIG. 5, the system 500 may provide candidate URLs 506 to the malware evaluator 508, which may provide them to the intrusion detection engine 305. In another example, candidate URLs represented in the status data base 614 can be provided to the malware detector 616 (see FIG. 6).

Stage 804 receives an intrusion score for the candidate landing page from the intrusion detection engine. For example, referring to FIG. 6, the status data base 614 may receive the intrusion score from the malware detector 616. The intrusion score can correspond to the ad's landing page that the malware detector 616 processed from the status data base 614.

Stage 806 precludes the serving of the advertisement associated with the candidate landing page if the intrusion score exceeds an intrusion threshold. For example, if the intrusion score of the ad's landing page processed by the malware detector 616 exceeds an intrusion threshold, the malware detector 616 may update the status data base 614 with information that the corresponding ad is to be flagged. Such information in the status data base 614 may be used later to update the ads data base 604. Ads that are flagged in the ads data base 604 may be precluded in various ways, such as by marking the served ads (e.g., in a user's browser) as containing potential malware or by preventing the ads from being served. Preclusion in stage 806 may also include suspending the advertiser's account, or in a tiered account system, raising the malware risk rating for the advertiser.

Figure 9:
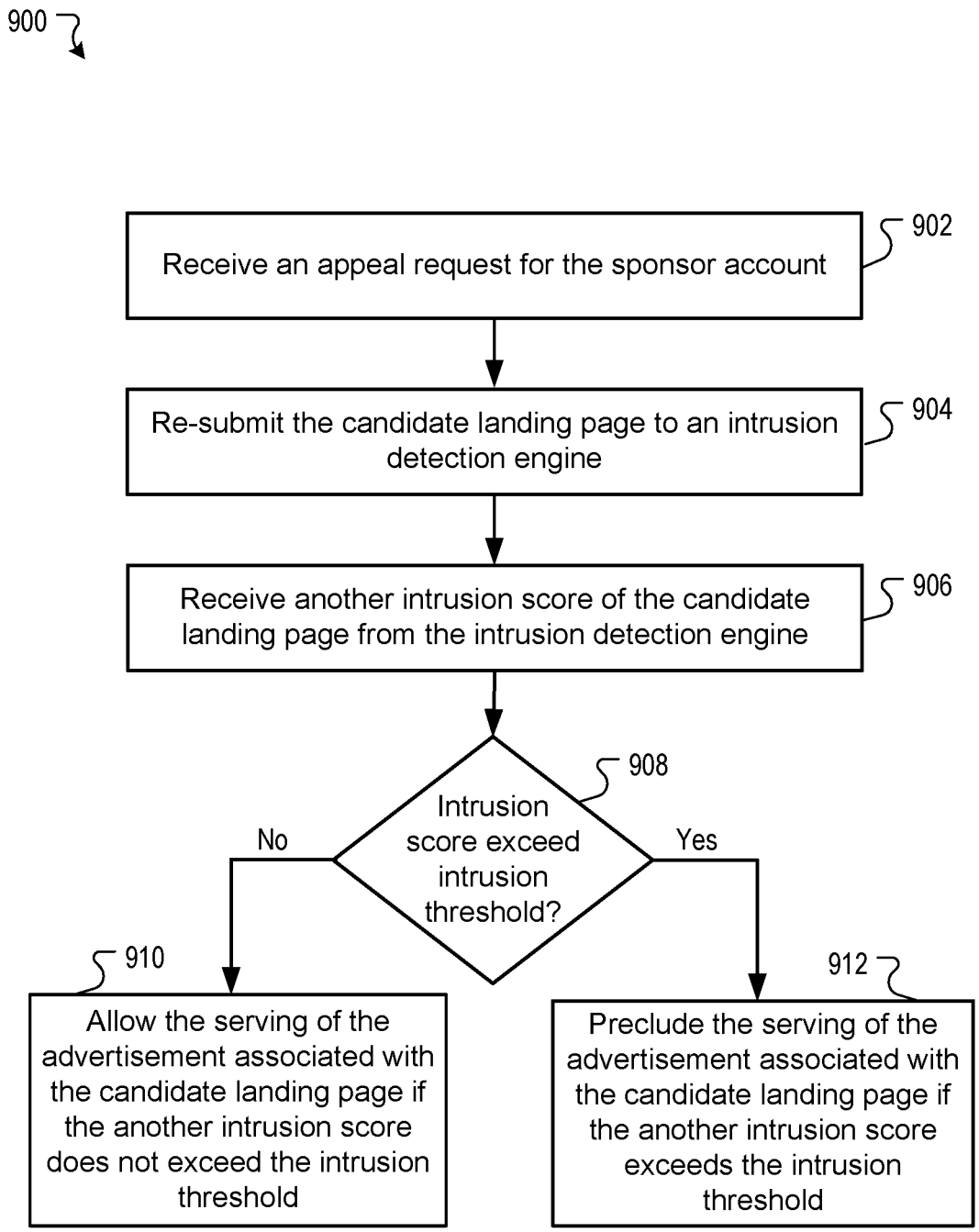
FIG. 9 is a flow diagram of an example process for handling an appeal request.

FIG. 9 is a flow diagram of an example process 900 for handling an appeal request. For example, the appeal request may be made by an advertiser after one or more of the advertiser's ads have been precluded, such as through the process 800. The process 900 may be implemented using software instructions stored in a computer readable medium and executed by a processing system.

Stage 902 receives an appeal request for the sponsor account. For example, the appeal may originate from the customer front end 618 of FIG. 6. The appeal request can be received, for example, by the malware hub 612 which may store information regarding the appeal request in the appeals data base 620.

Stage 904 re-submits the candidate landing page to an intrusion detection engine. For example, the system 600 may use information corresponding to the appeal that is stored in the appeals data base 620 to re-submit the candidate landing page to the malware detector 616, which can include or communicate with an intrusion detection engine.

Stage 906 receives another intrusion score of the candidate landing page from the intrusion detection engine. For example, as a result of the re-submission of stage 904, a new intrusion score for the ad can be generated and received. In general, this intrusion score may be lower for the ad's landing page, for example, if the advertiser who appealed the ad has since rid the ad's landing page of malware or provided a new landing page for the ad, e.g., by engaging a new publisher.

Stage 908 determines if the intrusion score exceeds an intrusion threshold. If the intrusion score exceeds the intrusion threshold, stage 910 precludes the serving of the advertisement associated with the candidate landing page if another intrusion score exceeds the intrusion threshold. For example, if the new intrusion score of the ad's landing page processed by the malware detector 616 exceeds the intrusion threshold, the malware detector 616 may update the appeals data base 620 with information that the corresponding ad is still associated with malware.

If the intrusion score does not exceed the intrusion threshold, then stage 912 allows the serving of the advertisement associated with the candidate landing page if another intrusion score does not exceed the intrusion threshold. For example, if the new intrusion score of the ad's landing page processed by the malware detector 616 does not exceed the intrusion threshold, the malware detector 616 may update the appeals data base 620 with information that the corresponding ad is now clean and may be served without restriction.

Figure 10:
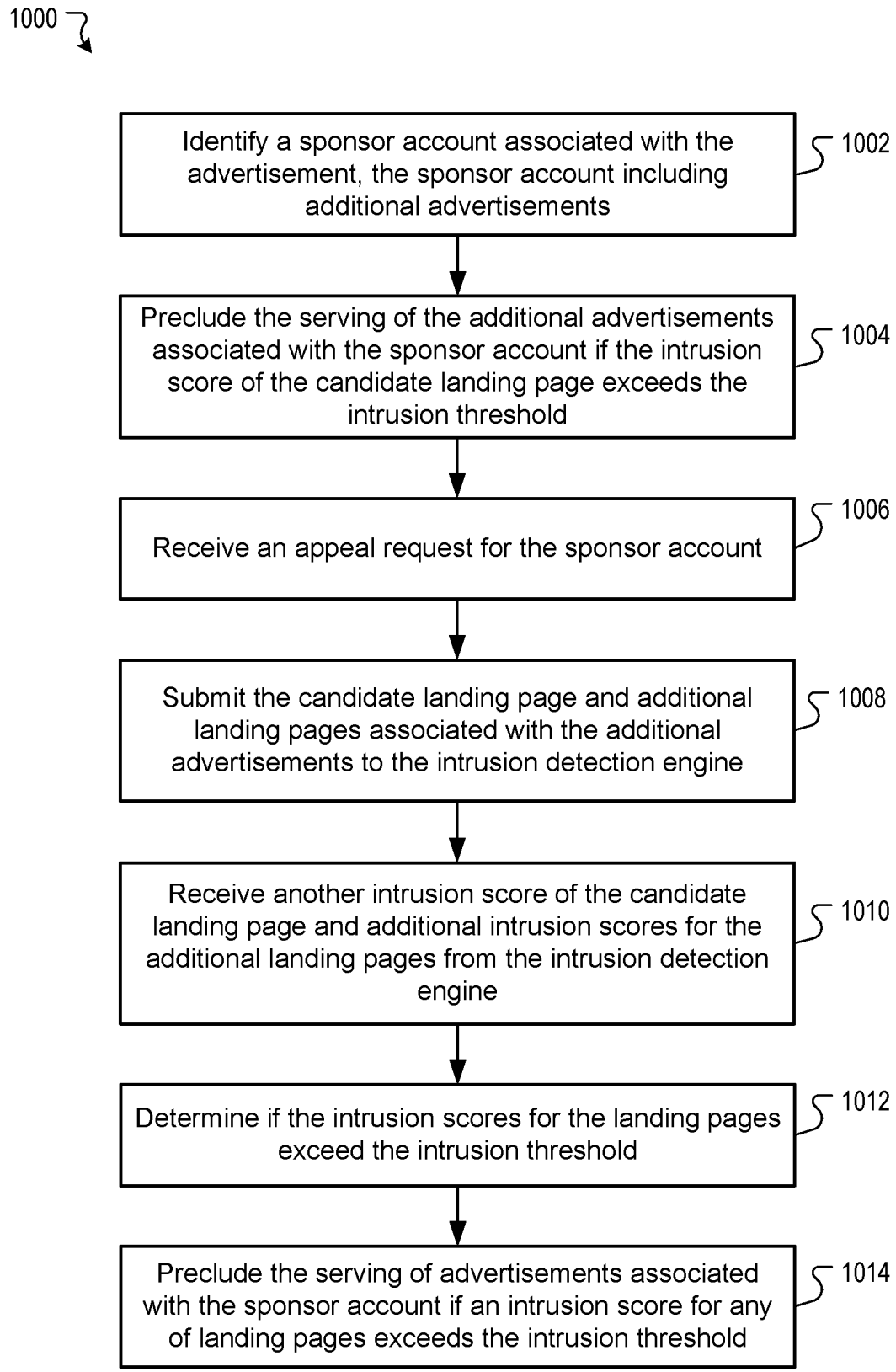
FIG. 10 is a flow diagram of another example process for handling an appeal request.

FIG. 10 is a flow diagram of another example process 1000 for handling an appeal request. For example, the appeal request may be made by an advertiser after one or more of the advertiser's ads have been precluded, such as through the process 800. The process 1000 may be implemented using software instructions stored in a computer readable medium and executed by a processing system.

Stage 1002 identifies a sponsor account associated with the advertisement, the sponsor account including additional advertisements. For example, referring to FIG. 6, the sponsor account may be associated with an ad that the malware detector 616 determines the ad's landing page to be infected with malware. The account may be identified, for example, in the adgroup criteria features data base 606 for the URL features database 608.

Stage 1004 precludes the serving of the additional advertisements associated with the sponsor account if the intrusion score of the candidate landing page exceeds the intrusion threshold. For example, using the sponsor's account information identified in stage 1002, the malware detector 616 can preclude the serving of the advertiser's additional ads. In particular, under the business policy represented by the process 1000, once one ad for an advertiser is determined to be associated with malware, that ad and all others for the advertiser can be flagged (and precluded).

Stage 1006 receives an appeal request for the sponsor account. For example, the appeal may originate from a user executing the customer front end 618 (see FIG. 6). The appeal request can be received, for example, by the malware hub 612 which may store information regarding the appeal request in the appeals data base 620.

Stage 1008 submits the candidate landing page and additional landing pages associated with the additional advertisements to the intrusion detection engine. For example, the system 600 may use information corresponding to the appeal that is stored in the appeals data base 620 to submit all of the advertiser's candidate landing pages to the malware detector 616, which can include an intrusion detection engine or provide the landing page information to an intrusion detection engine. As part of the process, the account information corresponding to the candidate landing page may be used to identify other ads in the ads data base 604 that correspond to the advertiser's account. Specifically, the candidate landing pages can include the original candidate landing page and additional landing pages associated with the additional advertisements for the advertiser.

Stage 1010 receives another intrusion score of the candidate landing page and additional intrusion scores for the additional landing pages from the intrusion detection engine. For example, as a result of the malware detector 616 evaluating all of the candidate landing pages for the advertiser, intrusion scores corresponding to the landing pages can be generated. In particular, the intrusion scores may be stored in (or received by) the appeals data base 620. In some implementations, the intrusion scores of the additional landing pages may be stored in the status data base 614.

Stage 1012 determines if the intrusion scores for the landing pages exceed the intrusion threshold. For example, the malware detector 616 can determine which, if any, of the landing pages' intrusion scores received in stage 1010 exceed the intrusion threshold.

Stage 1014 precludes the serving of advertisements associated with the sponsor account if an intrusion score for any of the landing pages exceeds the intrusion threshold. For example, if any of the intrusion scores are determined by the malware detector 616 to exceed the intrusion threshold, the malware detector 616 may update the appeals data base 620 with information that the sponsor's ads (as a whole) are still include malware and can be precluded from being served.

Figure 11:
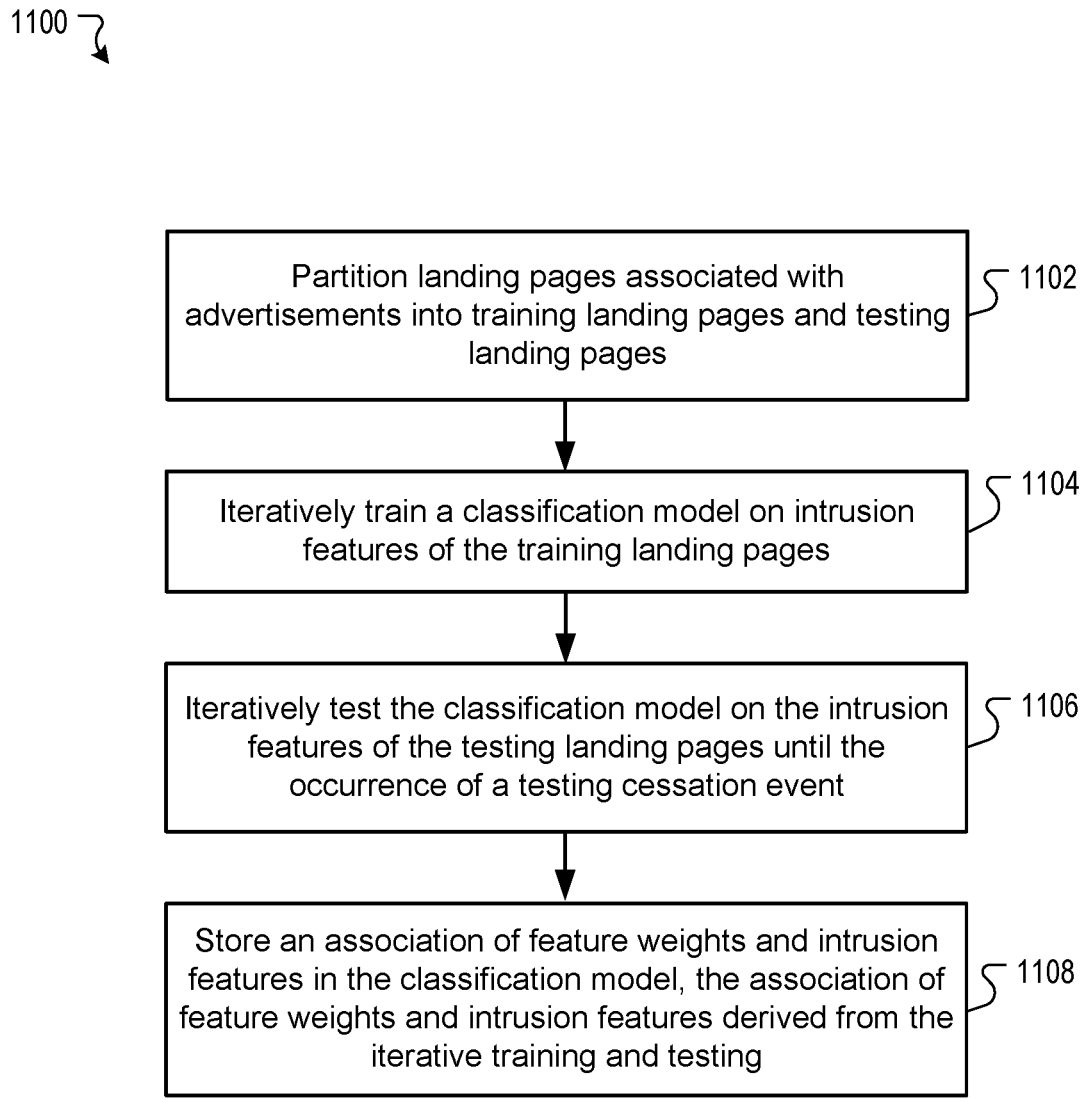
FIG. 11 is a flow diagram of an example process for generating a classification model.

FIG. 11 is a flow diagram of an example process 1100 for generating a classification model. For example, the process 1100 may be used to generate the classification model 402. The process 1100 may be implemented using software instructions stored in a computer readable medium and executed by a processing system.

Stage 1102 partitions landing pages associated with advertisements into training landing pages and testing landing pages. For example, referring to FIG. 4, the landing pages and URLs 404 may be divided into training landing pages that can be used as training examples to train the classification model 402, and landing pages that may be used to test the classification model 402.

Stage 1104 iteratively trains a classification model on intrusion features of the training landing pages. For example, using features extracted by the feature extraction engine 406 from the training landing pages obtained from the landing pages and URLs 404, the system 400 can iteratively train the classification model 402. The training may be performed by a combination of the control evaluation 408 and the machine learning engine 410.

Stage 1106 iteratively tests the classification model on the intrusion features of the testing landing pages until the occurrence of a testing cessation event. For example, using features extracted by the feature extraction engine 406 from the testing landing pages obtained from the landing pages and URLs 404, the system 400 can iteratively test the classification model 402. The testing may be performed by the machine learning engine 410. During testing, associations between feature weights and intrusion features can be adjusted, such as by using a linear regression model. Stages 1104 and 1106 can be repeated iteratively, for example, until the occurrence of a testing cessation event, such as the determination that the feature weights are good enough.

Stage 1108 stores an association of feature weights and intrusion features in the classification model, the association of feature weights and intrusion features derived from the iterative training and testing. For example, the associations between feature weights and intrusion features that are iteratively generated by stages 1104 and 1106 can be stored in the classification model 402.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method comprising:
identifying, by one or more processors, a landing page of a sponsored content item that is available for presentation on a website;
evaluating features of the landing page using a first malware detection process;
determining, by the one or more processors, that the landing page is a malware candidate based on the evaluation performed using the first malware detection process reveals that the landing page has one or more malware characteristics;
evaluating, by the one or more processors, the malware candidate using a different malware detection process that performs evaluations that are beyond those performed by the first malware detection process, including:
simulating selection of the sponsored content item that is linked to the landing page; and
evaluating one or more additional pages that differ from the landing page and that are in a redirect chain followed in response to the simulated selection of the sponsored content item for characteristics of malware;
flagging, by the one or more processors, the sponsored content item as malware when the different malware detection process detects malware in the one or more additional pages that are in the redirect chain; and
preventing, by the one or more processors, the sponsored content item from being served while the sponsored content item is flagged as malware.

2. The method of claim 1, wherein evaluating features of the landing page comprises evaluating iFrame features, URL features, or script features.

3. The method of claim 1, wherein simulating selection of the sponsored content item comprises simulating the selection using a virtual machine, and wherein the virtual machine is further configured to:
monitor usage of system files by the sponsored content item; and
monitor processes created by the sponsored content item.

4. A system comprising:
one or more computers and one or more storage devices storing instructions that, when executed by the one or more computers, cause the one or more computers to perform operations comprising:
identifying a landing page of a sponsored content item that is available for presentation on a website;
evaluating features of the landing page using a first malware detection process;
determining that the landing page is a malware candidate based on the evaluation performed using the first malware detection process reveals that the landing page has one or more malware characteristics;
evaluating the malware candidate using a different malware detection process that performs evaluations that are beyond those performed by the first malware detection process, including:
simulating selection of the sponsored content item that is linked to the landing page; and
evaluating one or more additional pages that differ from the landing page and that are in a redirect chain followed in response to the simulated selection of the sponsored content item for characteristics of malware;
flagging the sponsored content item as malware when the different malware detection process detects malware in the one or more additional pages that are in the redirect chain; and
preventing the sponsored content item from being served while the sponsored content item is flagged as malware.

5. The system of claim 4, wherein evaluating features of the landing page comprises evaluating iFrame features, URL features, or script features.

6. The system of claim 4, wherein simulating selection of the sponsored content item comprises simulating the selection using a virtual machine, and wherein the virtual machine is further configured to:
monitor usage of system files by the sponsored content item; and
monitor processes created by the sponsored content item.

7. A non-transitory computer-readable medium storing software comprising instructions executable by one or more computers which, upon such execution, cause the one or more computers to perform operations comprising:
- identifying a landing page of a sponsored content item that is available for presentation on a website;
- evaluating features of the landing page using a first malware detection process;
- determining that the landing page is a malware candidate based on the evaluation performed using the first malware detection process reveals that the landing page has one or more malware characteristics;
- evaluating the malware candidate using a different malware detection process that performs evaluations that are beyond those performed by the first malware detection process, including:
  - simulating selection of the sponsored content item that is linked to the landing page; and
  - evaluating one or more additional pages that differ from the landing page and that are in a redirect chain followed in response to the simulated selection of the sponsored content item for characteristics of malware;
- flagging the sponsored content item as malware when the different malware detection process detects malware in the one or more additional pages that are in the redirect chain; and
- preventing the sponsored content item from being served while the sponsored content item is flagged as malware.

8. The medium of claim 7, wherein evaluating features of the landing page comprises evaluating iFrame features, URL features, or script features.

* * * * *